US008609228B2

(12) United States Patent
Chen et al.

(10) Patent No.: US 8,609,228 B2
(45) Date of Patent: Dec. 17, 2013

(54) HIGH PERFORMANCE SEALABLE COEXTRUDED BIAXIALLY ORIENTED POLYPROPYLENE FILM

(75) Inventors: Yong Chen, Changchun (CN); Hongyu Chen, Zhanjiang (CN); Xiao Bing Yun, Beijing (CN); Jing Li, Shanghai (CN); Morgan M. Hughes, Angleton, TX (US); Rajen M. Patel, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 617 days.

(21) Appl. No.: 12/757,091

(22) Filed: Apr. 9, 2010

(65) Prior Publication Data

US 2010/0260996 A1 Oct. 14, 2010

(51) Int. Cl.
*B32B 7/02* (2006.01)

(52) U.S. Cl.
USPC ............ 428/212; 428/220; 428/337; 428/523

(58) Field of Classification Search
USPC ................ 428/220, 337, 523, 212, 411.1
See application file for complete search history.

(56) References Cited

U.S. PATENT DOCUMENTS

| | | | |
|---|---|---|---|
| 4,643,945 A | 2/1987 | Kiang | |
| 5,151,317 A | 9/1992 | Bothe | |
| 5,234,733 A | 8/1993 | Schloegl et al. | |
| 5,326,625 A | 7/1994 | Schuhmann et al. | |
| 5,366,796 A | 11/1994 | Murschall et al. | |
| 5,376,437 A | 12/1994 | Kawakami et al. | |
| 5,429,862 A | 7/1995 | Schuhmann et al. | |
| 5,436,041 A | 7/1995 | Murschall et al. | |
| 5,489,454 A | 2/1996 | Peiffer et al. | |
| 5,498,474 A | 3/1996 | Schuhmann et al. | |
| 5,508,090 A | 4/1996 | Peiffer et al. | |
| 5,560,885 A | 10/1996 | Murschall et al. | |
| 5,681,650 A | 10/1997 | Peiffer et al. | |
| 5,691,043 A | 11/1997 | Keller et al. | |
| 5,776,589 A * | 7/1998 | Mace et al. ................... | 428/212 |
| 5,817,412 A | 10/1998 | Lohmann et al. | |
| 5,874,139 A | 2/1999 | Bosiers et al. | |
| 5,900,294 A | 5/1999 | Murschall et al. | |
| 5,900,310 A | 5/1999 | Murschall et al. | |
| 6,010,588 A | 1/2000 | Stahl et al. | |
| 6,326,068 B1 | 12/2001 | Kong et al. | |
| 6,423,420 B1 | 7/2002 | Brant et al. | |
| 6,451,426 B2 | 9/2002 | Kong et al. | |
| 6,495,246 B1 | 12/2002 | Sakaguchi et al. | |
| 6,503,637 B1 | 1/2003 | Van Loon | |
| 6,521,333 B1 | 2/2003 | Blyth | |
| 6,562,478 B1 | 5/2003 | Fischer et al. | |
| 6,713,137 B1 | 3/2004 | Andersson et al. | |
| 6,777,067 B1 | 8/2004 | Speith-Herfurth et al. | |
| 6,811,886 B1 | 11/2004 | Speith-Herfurth et al. | |
| 7,195,818 B2 | 3/2007 | Kong et al. | |
| 7,285,335 B2 | 10/2007 | Aral et al. | |
| 2003/0032731 A1 | 2/2003 | Oswald et al. | |
| 2004/0105994 A1 | 6/2004 | Lu et al. | |
| 2006/0199006 A1 | 9/2006 | Poon et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199884 A1 | 9/2006 | Hoenig et al. | |
| 2006/0199887 A1 | 9/2006 | Liang et al. | |
| 2006/0199896 A1 | 9/2006 | Walton et al. | |
| 2006/0199897 A1 | 9/2006 | Karjala et al. | |
| 2006/0199905 A1 | 9/2006 | Hughes et al. | |
| 2006/0199906 A1 | 9/2006 | Walton et al. | |
| 2006/0199907 A1 | 9/2006 | Chang et al. | |
| 2006/0199908 A1 | 9/2006 | Cheung et al. | |
| 2006/0199910 A1 | 9/2006 | Walton et al. | |
| 2006/0199911 A1 | 9/2006 | Markovich et al. | |
| 2006/0199912 A1 | 9/2006 | Fuchs et al. | |
| 2006/0199914 A1 | 9/2006 | Harris et al. | |
| 2006/0199930 A1 | 9/2006 | Li Pi Shan et al. | |
| 2006/0199931 A1 | 9/2006 | Poon et al. | |
| 2006/0199983 A1 | 9/2006 | Kammerhofer et al. | |
| 2007/0110997 A1 * | 5/2007 | Aguirre .................... | 428/349 |
| 2008/0131638 A1 * | 6/2008 | Hutton et al. ............. | 428/36.6 |
| 2009/0205994 A1 | 8/2009 | Sase et al. | |

FOREIGN PATENT DOCUMENTS

| | | |
|---|---|---|
| EP | 0137454 A2 | 4/1985 |
| EP | 273680 A2 | 7/1988 |
| EP | 411968 A1 | 2/1991 |
| EP | 481344 A1 | 4/1992 |
| EP | 774350 A2 | 5/1997 |
| EP | 802046 A2 | 10/1997 |
| EP | 831994 A1 | 4/1998 |
| EP | 912338 A1 | 5/1999 |
| EP | 963408 A1 | 12/1999 |
| EP | 1878567 A1 | 1/2008 |
| WO | WO-9214784 A2 | 9/1992 |
| WO | WO-9837141 A1 | 8/1998 |
| WO | WO-03040442 A1 | 5/2003 |
| WO | WO-2005032815 A1 | 4/2005 |
| WO | WO-2005090427 | 9/2005 |
| WO | WO-2007024447 A1 | 3/2007 |
| WO | WO-2008080111 A1 | 7/2008 |

OTHER PUBLICATIONS

International Search Report (PCT/CN2009/071236), Jan. 7, 2010.

* cited by examiner

*Primary Examiner* — Maria Veronica Ewald
*Assistant Examiner* — Lawrence Ferguson

(57) ABSTRACT

A multilayer biaxially oriented polypropylene film is disclosed which comprises at least three layers. The first layer is an outer layer comprising a first polymer which is a homopolymer polypropylene resin having a melting point of at least 155° C. The second layer is a core layer, having a melting point greater than 150° C. The core layer includes a blend comprising a second polymer which is a polypropylene homopolymer having a melting point of at least 155° C. and a third polymer having a melting point no greater than 145° C. The second polymer comprises from 20% to 80% by weight of the core layer while the third polymer comprises from 80% to 20% by weight of the core layer. The last required layer in the film is a sealant layer. The sealant layer comprises a fourth polymer having a melting point no greater than 145° C.

15 Claims, 1 Drawing Sheet

HIGH PERFORMANCE SEALABLE COEXTRUDED BIAXIALLY ORIENTED POLYPROPYLENE FILM

BACKGROUND AND SUMMARY OF THE INVENTION

The present invention relates to a biaxially oriented polypropylene film capable of being formed by coextrusion, and characterized by having a relatively high seal strength and a relatively low heat seal initiation temperature. The film of the present invention is well suited for dry food packaging applications.

The world's demand for biaxially oriented polypropylene (BOPP) film has grown by an average of 8.7% per year since 2000. BOPP films comprise at least one propylene-containing layer. Flexible packaging for dry food is one of the major applications of BOPP. At present, dry food packaging is dominated by the multi-ply dry laminated BOPP films. These films are heat sealable and are usually produced by joining a BOPP film with a separate sealant film such as a polyethylene or cast polypropylene (CPP) film through adhesive lamination techniques. Generally, these BOPP laminated structures have heat seal strength of approximately 15-40 N/25 mm and heat seal initiation temperatures (HSIT) around 105° C. (when polyethylene is used as the sealant film).

Coextruded (or "co-ex") BOPP film is another kind of heat sealable BOPP based film which can be used for packaging. These films are produced by coextrusion of polypropylene and sealant resin to form a sheet and then biaxially stretching the sheet to form the biaxially oriented film. The production of co-ex BOPP is a more cost effective process vs. the adhesive lamination process, as the film is made in a single step and no adhesive is required. However, the heat seal strength of currently available co-ex BOPP films drops to around 5-8 N/25 mm and the HSIT increases by about 10° C. after biaxial stretching. Due to the reduced seal strength, co-ex BOPP films are currently only used for packaging small articles or articles not requiring high seal strengths, such as cigarette packaging, or light-weight food like bread.

It would be desirable to develop co-ex BOPP films to replace the laminated BOPP films in order to cut cost and eliminate the adhesive involved in the lamination process and yet have comparable heat seal strength and HSIT.

Therefore in one aspect of the present invention a multilayer biaxially oriented polypropylene film is provided. The film comprises at least three layers. One layer is an outer layer comprising a first polymer which is a homopolymer polypropylene resin having a melting point of at least 155° C. A second layer is a core layer comprising a blend comprising a second polymer which is a polypropylene homopolymer having a melting point of at least 155° C. and a third polymer having a melting point no greater than 145° C. and a Vicat softening point of at least 60° C., wherein the third polymer comprises no more than 80% by weight of the core layer. A third layer is a sealant layer comprising a fourth polymer having a melting point no greater than 145° C.

Another aspect of the invention is the use of the films of the present invention for packaging dry foods. In particular, the films of the present invention which have a preferred heat seal strength of at least 10 N/25 mm (even when the core layer is less than 10 µm thick), and a preferred heat seal initiation temperature no greater than 130° C., are well suited for this application.

DETAILED DESCRIPTION OF THE INVENTION

Test Methods

Figure 1:
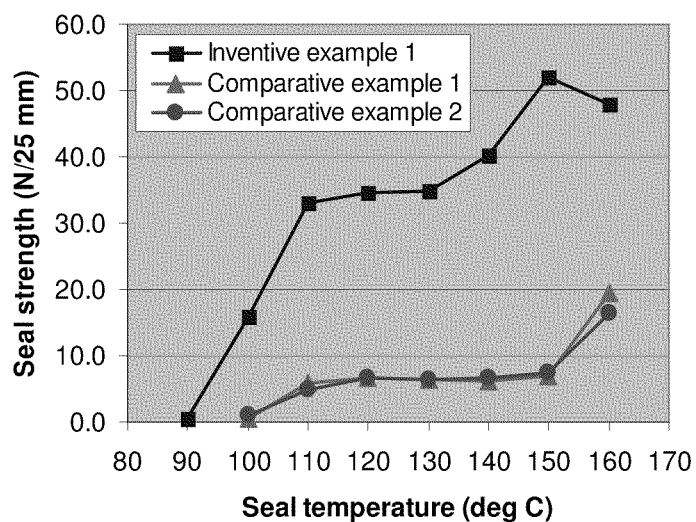
FIG. 1 is a graph of the heat seal strength vs. seal temperature curves for inventive example 1 and comparative example 1 and 2.

Unless otherwise indicated, the following properties are determined by the indicated test method throughout this specification.

Melting point is determined using a differential scanning calorimeter (DSC). The temperature at the maximum heat flow rate with respect to a linear baseline was used as the melting point as measured by DSC. The linear baseline was constructed from the beginning of the melting (above the glass transition temperature) and to the end of the melting. The temperature was raised from room temperature to 200° C. at 10° C./min, maintained at 200° C. for 5 min, decreased to 0° C. at 10° C./min, maintained at 0° C. for 5 min and then the temperature was raised from 0° C. to 200° C. at 10° C./min, and the results are taken from this second heating cycle. The melting and cooling curves were recorded. When plural melting peaks were present, the melting peak at the maximum temperature was used as the melting point.

Vicat softening point is determined according to ASTM D-1525.

Density is determined according to ASTM D-792.

Melt flow rate for propylene polymers (that is, those polymers comprising greater than 50% by weight of units derived from propylene monomer) is determined according to ASTM D1238, 230° C., 2.16 kg).

Melt index, or $I_2$, for ethylene polymers (that is, those polymers comprising at least 50% by weight of units derived from ethylene monomer) is determined according to ASTM D1238, 190° C., 2.16 kg.

Heat seal strength is determined in accordance with the following method as used on a J&B hot-tack tester model 4000 and ZWICK Z010 Universal Tensile Tester with the following settings:

Sample width: 25 mm
Seal pressure: 0.275 N/mm²
Seal time: 0.5 s
Condition time (after heat seal): 24 hours
Peel speed: 500 mm/min Heat seal initiation temperature is determined as the minimum temperature at which a seal of 4.4 N/25 mm or 1 lb/inch was obtained.

In one aspect, the present invention comprises a multilayer biaxially oriented polypropylene film comprising:

a. an outer layer comprising a first polymer which is a homopolymer polypropylene resin having a melting point of at least 155° C.;
b. a core layer, with a melting point greater than 150° C., comprising a blend comprising a second polymer which is a polypropylene homopolymer having a melting point of at least 155° C. and a third polymer having a melting point no greater than 145° C., wherein the second polymer comprises from 20% to 80% by weight of the core layer while the third polymer comprises from 80% to 20% by weight of the core layer; and
c. a sealant layer comprising a fourth polymer having a melting point no greater than 145° C.

The outer layer of the film of the present invention comprises a first polymer. The first polymer comprises a homopolymer polypropylene resin having a melting point greater than or equal to 155° C., more preferably greater than or equal to 160° C. A particularly desirable polyolefin that may be used as polymer in the outer layer is an isotactic propylene homopolymer having (i) an isotacticity of from about 89 to 99% (as measured by $^{13}$C NMR spectroscopy using meso pentads), (ii) a melting point of from about 155° C. to about 165° C., and (iii) a melt flow rate of from about 0.5 to about 15 g/10 minutes. The homopolymer polypropylene may be produced by using Ziegler-Natta or metallocene catalysts. Metallocene-catalyzed isotactic polypropylenes made developmentally or commercially are EOD 96-21 and EOD 97-09, from Fina Oil and Chemical Co., EXPP-129, from ExxonMobil Chemical Co., and Novalen M, from BASF GmbH., and H314-02Z from the Dow Chemical Company among others. Preferably the resin used in the outer layer of the film comprises only homopolymer polypropylene.

The core layer of the film comprises a blend of at least two polymers, designated herein as the second polymer and the third polymer. The second polymer comprises a homopolymer polypropylene resin having a melting point greater than or equal to 155° C., more preferably greater than or equal to 160° C. A particularly desirable polyolefin that may be used as polymer in the outer layer is an isotactic propylene homopolymer having (i) an isotacticity of from about 89 to 99% (as measured by $^{13}$C NMR spectroscopy using meso pentads), (ii) a melting point of from about 155° C. to about 165° C., and (iii) a melt flow rate of from about 0.5 to about 15 g/10 minutes. The homopolymer polypropylene may be produced by using Ziegler-Natta or metallocene catalysts. This polymer can advantageously (but not necessarily) be the same material as the first polymer.

The third polymer (that is, the second mandatory component of the blend of which the core layer of the film is comprised) comprises a polymer having a melting point less than or equal to 145° C., more preferably less than or equal to 130° C., or even less than or equal to 110° C., more preferably in the range of 100° C. to 120° C. Preferably, the third polymer will have a Vicat softening temperature greater than or equal to 60° C. The third polymer can advantageously be an ethylene copolymer having a density less than about 0.916 g/cc, more preferably less than about 0.910 g/cc, a propylene based plastomer or elastomer (or "PBPE"), or an olefin block copolymer (or "OBC") or a blend comprising one or more of the above materials.

The ethylene copolymers suitable for use as the third polymer in the films of the present invention can be an interpolymer of ethylene with at least one $C_3$-$C_{20}$ alpha-olefin, as stated in U.S. 2003/0032731. Preferably the ethylene copolymer is a copolymer of ethylene with 1-butene, 1-hexene, or 1-octene, with 1-octene being the most preferred. The ethylene copolymers suitable for use as the third polymer may be linear (that is, with no long chain branching) or substantially linear. The ethylene copolymer may advantageously be made using a gas phase process or a solution process as is known in the art, although solution is generally preferred in order to produce polymer with lower densities. Similarly, the catalyst used to make the LLDPE is not limited and includes Ziegler Natta type catalysts as well as metallocenes. Exemplary ethylene copolymers for use in the present inventing include EXACT™ polymers from Exxon-Mobil Chemical Company, AFFINITY™ polymers and ENGAGE™ polymers from The Dow Chemical Company, and TAFMER™ polymers from Mitsui Chemicals.

The PBPE materials suitable for use as the third polymer in the films of the present invention comprise at least one copolymer with at least about 50 weight percent of units derived from propylene and at least about 1 weight percent of units derived from a comonomer other than propylene. Suitable propylene based elastomers and/or plastomers are taught in WO03/040442, and WO2007/024447, each of which is hereby incorporated by reference in its entirety.

Of particular interest for use in the present invention are reactor grade PBPEs having MWD less than 3.5. It is intended that the term "reactor grade" is as defined in U.S. Pat. No. 6,010,588 and in general refers to a polyolefin resin whose molecular weight distribution (MWD) or polydispersity has not been substantially altered after polymerization. The preferred PBPE will have a heat of fusion (as determined using the DSC method described in WO2007/024447) less than about 90 Joules/gm, preferably less than about 70 Joules/gm, more preferably less than about 50 Joules/gm. When ethylene is used as a comonomer, the PBPE has from about 0.04 to about 15 percent of ethylene, or from about 5 to about 14 percent of ethylene, or about 5 to 12 percent ethylene, by weight of the propylene based elastomer or plastomer.

Although the remaining units of the propylene copolymer are derived from at least one comonomer such as ethylene, a $C_{4-20}$ α-olefin, a $C_{4-20}$ diene, a styrenic compound and the like, preferably the comonomer is at least one of ethylene and a $C_{4-12}$ α-olefin such as 1-hexene or 1-octene. Preferably, the remaining units of the copolymer are derived only from ethylene.

The amount of comonomer other than ethylene in the propylene based elastomer or plastomer is a function of, at least in part, the comonomer and the desired heat of fusion of the copolymer. If the comonomer is ethylene, then typically the comonomer-derived units comprise not in excess of about 15 wt % of the copolymer. The minimum amount of ethylene-derived units is typically at least about 1, preferably at least about 3, more preferably at leas about 5 and still more preferably at least about 9, wt % based upon the weight of the copolymer. If the polymer comprises at least one other comonomer other than ethylene, then the preferred composition would have a heat of fusion approximately in the range of a propylene-ethylene copolymer with about 3 to 20 wt. % ethylene. The propylene based plastomer or elastomer of this invention can be made by any process, and includes copolymers made by Ziegler-Natta, CGC (Constrained Geometry Catalyst), metallocene, and nonmetallocene, metal-centered, heteroaryl ligand catalysis. These copolymers include random, block and graft copolymers although preferably the copolymers are of a random configuration. Exemplary propylene copolymers include Exxon-Mobil VISTAMAXX™ polymer, and VERSIFY™ propylene/ethylene elastomers and plastomers by The Dow Chemical Company.

The density of the propylene based elastomers or plastomers of this invention is typically at least about 0.850, can be at least about 0.860 and can also be at least about 0.865 grams per cubic centimeter (g/cm$^3$) as measured by ASTM D-792. Preferably the density is less than about 0.893 g/cc.

The weight average molecular weight (Mw) of the propylene based elastomers or plastomers of this invention can vary widely, but typically it is between about 10,000 and 1,000,000, alternatively between about 50,000 and 500,000 or between 100,000 and 250,000 (with the understanding that the only limit on the minimum or the maximum $M_w$ is that set by practical considerations).

The polydispersity of the propylene based elastomers or plastomers of this invention is typically between about 2 and about 5. "Narrow polydispersity", "narrow molecular weight distribution", "narrow MWD" and similar terms mean a ratio ($M_w/M_n$) of weight average molecular weight ($M_w$) to number average molecular weight ($M_n$) of less than about 3.5, can be less than about 3.0, can also be less than about 2.8, can also be less than about 2.5.

The PBPEs for use in the present invention ideally have an MFR of from 0.2 to 2000 g/10 min, preferably from about 0.5 to 1000, more preferably from about 2 to 500, still more preferably from about 2 to 40. The particular MFR selected will depend in part on the intended fabrication methods such as blown film, extrusion coating, sheet extrusion, injection molding or cast film processes. MFR for copolymers of propylene and ethylene and/or one or more $C_4$-$C_{20}$ α-olefins is measured according to ASTM D-1238, condition L (2.16 kg, 230° C.).

MFRs greater than about 250 were estimated according to the following correlation:

$$MFR=9\times10^{18}\,Mw^{-3.3584}$$

Mw (grams per mole) was measured using gel permeation chromatography.

The blend of which the core layer is comprised preferably comprises from 20% to 80% (by weight of the blend) of the second polymer, more preferably from 30% to 70%, and from 20% to 80% of the third polymer. More preferably the third polymer comprises less than or equal to 70%, or even less than or equal to about 60% by weight of the blend. The blend may also include other polymers, although it is preferred that the blend contain no other resins than the ethylene based polymers and/or propylene based polymers.

The olefin block copolymers suitable for use as the third polymer in the films of the present invention are a relatively new class of material which are more fully described in WO 2005/090427, US2006/0199931, US2006/0199930, US2006/0199914, US2006/0199912, US2006/0199911, US2006/0199910, US2006/0199908, US2006/0199907, US2006/0199906, US2006/0199905, US2006/0199897, US2006/0199896, US2006/0199887, US2006/0199884, US2006/0199872, US2006/0199744, US2006/0199030, US2006/0199006 and US2006/0199983; each publication being fully incorporated herein by reference. Olefin block copolymers are also known as "OBCs" or olefin multi-block interpolymers, The OBCs may be made with two catalysts incorporating differing quantities of comonomer and a chain shuttling agent. Preferred olefin multi-block interpolymers are ethylene/α-olefin multi-block interpolymers. The ethylene/α-olefin multi-block interpolymers typically comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers.

The ethylene multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprise all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in WO/2008/080111, entitled "Ethylene/α-Olefin Block Interpolymers", with a priority date of Mar. 15, 2006, in the name of Colin L. P. Shan, Lonnie Hazlitt, et. al. and assigned to Dow Global Technologies Inc., the disclosure of which is incorporated by reference herein in its entirety.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In one embodiment, an ethylene/α-olefin multi-block interpolymer has an ethylene content of from 60 to 90 percent, a diene content of from 0 to 10 percent, and an α-olefin content of from 10 to 40 percent, based on the total weight of the polymer. In one embodiment, such polymers are high molecular weight polymers, having a weight average molecular weight (Mw) from 10,000 to about 2,500,000, preferably from 20,000 to 500,000, more preferably from 20,000 to 350,000; a polydispersity less than 3.5, more preferably less than 3 and as low as about 2; and a Mooney viscosity (ML (1+4) at 125° C.) from 1 to 250.

In one embodiment, the ethylene multi-block interpolymers have a density of less than about 0.90, preferably less than about 0.89, more preferably less than about 0.885, even more preferably less than about 0.88 and even more preferably less than about 0.875, g/cc. In one embodiment, the ethylene multi-block interpolymers have a density greater than about 0.85, and more preferably greater than about 0.86, g/cc. Density is measured by the procedure of ASTM D-792. Low density ethylene multi-block copolymers are generally characterized as amorphous, flexible, and have good optical properties, for example, high transmission of visible and UV-light and low haze.

In one embodiment, the ethylene multi-block interpolymers have a melting point of less than about 125° C. The melting point is measured by the differential scanning calorimetry (DSC) method described in U.S. Publication 2006/0199930 (WO 2005/090427), incorporated herein by reference.

OBCs are identified by The Dow Chemical Company by the use of the INFUSE™ trademark, and also include D9100, D9500 developmental resins.

The film of the present invention also comprises a sealant layer, the third mandatory layer in the film. The sealant layer comprises a fourth polymer having a melting point less than or equal to 140° C., preferably less than or equal to 130° C., 120° C. or even 110° C. The fourth polymer preferably has a melting point greater than 75° C. The fourth polymer can advantageously be an ethylene copolymer having a density less than about 0.925 g/cc, more preferably less than about 0.910 g/cc, or a PBPE, or an OBC, or blends comprising one or more of these materials. The ethylene copolymers, OBCs or PBPEs suitable for use as the fourth polymer are the same type as described above for the third polymer, and in fact in some embodiments it may be preferred that the third polymer and the fourth polymer be the same material. Even if not the exact same material it may be preferable that the third and fourth polymer be the same class of material (for example both be ethylene copolymers, or both be PBPEs or both be OBCs).

As will be readily understood by practitioners in the art, it is also contemplated that any of the resins used in the present invention (in either the outer, core, sealant or additional layers) may include minor amounts of additives such as antioxidants (e.g., hindered phenols e.g., Irganox® 1010 made by Ciba-Geigy Corp.), phosphites (e.g., Irgafos® 168 made by Ciba-Geigy Corp.), cling additives (e.g., polyisobutylene (PIB)), polymeric processing aids (such as Dynamar™ 5911 from Dyneon Corporation, and Silquest™ PA-1 from General Electric), antiblock additives, slip additives such as Erucamide, pigments, etc. In some applications additives may advantageously be used in skin layer to reduce stickiness in machine direction orientation-rollers (MDO) during process and modify the coefficient of friction (COF) to desired levels for ease of handling.

The film of the present invention is prepared by melt coextrusion of all the layers using the resins as mentioned above and then by biaxial stretching as is generally known in the art, such as via the double bubble or tenterframe biaxial orientation processes.

Preferably the film of the present invention will have a total thickness of from 15 to 80 μm, more preferably from 20 to 50 μm.

Preferably the outer layer in the films of the present invention will have a thickness of from 10 to 70 μm, more preferably 10 to 40 μm.

Preferably the core layer in the films of the present invention will have a thickness of from 2 to 40 μm, or 3 to 30 μm, more preferably 4 to 10 μm.

Preferably the sealant layer in the films of the present invention will have a thickness of from 0.4 to 20 μm, or 0.5 to 10 μm, more preferably 1 to 5 μm.

It is also contemplated that the films of the present invention may contain additional layers, although it is generally preferred that the films consist of only three layers.

The preferred films of the present invention will exhibit a high seal strength, preferably greater than or equal to 8 N/25 mm, more preferably greater than or equal to 10 N/25 mm. The preferred films of the present inventing will also exhibit low heat seal initiation temperatures, such as less than or equal to 130, 115, 105 or even 100° C. Accordingly, the preferred films of the present invention will meet the heat seal requirements for the food packaging market or any other application requiring these properties.

EXAMPLES

The following materials are used in the Examples described below.

Resin A is polypropylene homopolymer (hPP) having a density of 0.900 g/cm$^3$; an MFR of 2 g/10 min (230° C., 2.16 Kg), and a melting point of 162° C.

Resin B is propylene-ethylene based elastomer or plastomer, with an ethylene content 5 wt %; a density of 0.888 g/cm$^3$; an MFR of 8 g/10 min (230° C., 2.16 Kg); a melting point of 105° C.; and a Vicat softening point of 90° C.

Resin C is a propylene-ethylene-butene random terpolymer, with ethylene content of 6.2 wt % and a butene content of 15.1 wt %; a density of 0.902 g/cm$^3$; an MFR of 6 g/10 min (230° C., 2.16 Kg); and a melting point of 133° C.

Resin D is a 50/50 blend of Resin A and Resin B. The melting point of Resin D is 162° C.

Resin E is a 20/80 blend of Resin A and Resin B. Melting point of Resin E is 162° C.

Resin F is a 80/20 blend of Resin A and Resin B. Melting point of Resin F is 162° C.

The melt compounding of Resins D, E, and F is carried out in a 30 mm twin screw extruder. The components are dry blended and then fed into the extruder through the main feed throat. The temperatures are set at 150-200-200-210-210-220° C. (from hopper to die). An open vent port without vacuum is used. The polymer is extruded through a 3.2 mm 2-hole strand die with output 15 kg/hr and screw speed 300 rpm. The strands are quenched by an ambient temperature water bath and then are strand cut by a ConAir pelletizer.

To make the film, The pellets are converted on a coextrusion sheet extrusion line fitted with four separate extruders (Me-100, Me-200 Me-300 Me-400), a mini coextrusion modular quick change feedblock assembly. The sheets are made at a gauge of 0.5 to 1.1 mm, and the die gap is set approximately to the desired gauge of the sheet structure, and the screw speed is set at from 40 to 120 rpm. Two extruders are used to produce the two layer sheets. The temperature control of the extruders for the three and two layer co-ex sheets are listed in Table 1 and Table 2, respectively.

TABLE 1

Temperature control of the extruders for the three layer co-ex sheets

| Extruder | Me-100 | Me-200 | Me-300 | Me-400 |
|---|---|---|---|---|
| Zone 1 Temp (° C.) | 155 | 150 | 110 | 120 |
| Zone 2 Temp (° C.) | 165 | 160 | 120 | 125 |
| Zone 3 Temp (° C.) | 175 | 160 | 120 | 135 |
| Zone 4 Temp (° C.) | 190 | 160 | | 135 |
| Zone 5 Temp (° C.) | 190 | 160 | | |
| Gate Temp (° C.) | 190 | 160 | 120 | 135 |

TABLE 2

Temperature control of the extruders for the two layer co-ex sheets

| Extruder | Me-100 | Me-200 | Me-300 | Me-400 |
|---|---|---|---|---|
| Zone 1 Temp (° C.) | 155 | | 160 | |
| Zone 2 Temp (° C.) | 165 | | 170 | |
| Zone 3 Temp (° C.) | 175 | | 180 | |
| Zone 4 Temp (° C.) | 190 | | | |
| Zone 5 Temp (° C.) | 190 | | | |
| Gate Temp (° C.) | 190 | | 180 | |

The co-ex sheets are then biaxially oriented in a simultaneous manner on Bruckner Laboratory Film Stretcher Type KARO IV. The sheet is first cut into an 85 mm×85 mm plaque, and then the plaque is clamped with five clips on each edge. The sample loading unit is moved into the oven with the plaque, and is equilibrated for 60 seconds prior to stretching. The temperature on the sheet is monitored and it was found that 60 seconds was long enough to equilibrate the plaque at the target orientation temperature (155° C.). The sheet is then simultaneously stretched at the speed of 400% s$^{-1}$ to a prescribed stretching ratio (5×5). The oriented film is removed from the sample loading unit and conditioned for >7 days prior to testing.

The co-ex BOPP films were prepared according to the following formulations:

| Sample identification | Structure | Outer layer (base layer) | Outer layer thickness (micron) | Core layer | Core layer thickness (micron) | Sealant layer | Sealant layer thickness (micron) | Seal strength at 110° C. (N/25 mm) | Heat seal initiation temp. (° C.) |
|---|---|---|---|---|---|---|---|---|---|
| Comparative example 1 | Two layer film | Resin A | 25 | / | / | Resin B | 5 | 6 | 110 |
| Comparative example 2 | Two layer film | Resin A | 25 | / | / | Resin C | 5 | 5 | 110 |
| Inventive example 1 | Three layer film | Resin A | 20 | Resin D | 20 | Resin B | 5 | 33 | 93 |
| Inventive example 2 | Three layer film | Resin A | 20 | Resin D | 6 | Resin B | 5 | 28 | 92 |
| Inventive example 3 | Three layer film | Resin A | 20 | Resin E | 6 | Resin B | 5 | 10 | 95 |
| Inventive example 4 | Three layer film | Resin A | 20 | Resin F | 6 | Resin B | 5 | 10 | 94 |

The standard heat seal and hot tack tests are conducted in on J&B hot-tack tester model 4000 and ZWICK Z010 Universal Tensile Tester with parameters listed below:

Sample width: 25 mm
Seal pressure: 0.275 N/mm$^2$
Seal time: 0.5 s
Delay time (hot tack): 0.1 s
Condition time (after heat seal): 24 hours
Peel speed (heat seal): 500 mm/min
Peel speed (hot tack): 200 mm/s
Five data points are collected and averaged.

The determination of the melting point ($T_m$) is performed using a differential scanning calorimeter (DSC). The temperature at the maximum heat flow rate with respect to a linear baseline was used as the melting point as measured by DSC. The temperature is raised from room temperature to 200° C. at 10° C./min, maintained at 200° C. for 5 min, decreased to 0° C. at 10° C./min, maintained at 0° C. for 5 min and then the temperature is raised from 0° C. to 200° C. at 10° C./min. The melting and cooling curves are recorded. When plural melting peaks are present, the melting peak at the maximum temperature is used as the melting point.

The heat seal strength vs. seal temperature curves of inventive example 1 and comparative example 1 and 2 are shown in FIG. 1. As seen in that Figure, the heat seal strength of the two comparative examples (two layer co-ex BOPP film produced conventionally) is very low, averaging about 5 to 7 N/25 mm, even at seal temperatures above 110° C., and even though different sealants are used. The heat seal initiation temperature ("HSIT") (the minimum temperature at which a seal strength of 4.4 N/25 mm was obtained) for the two comparative examples is around 110° C. In contrast, the heat seal strength of the three layer co-ex BOPP film prepared by using inventive technology reaches a high level of ca. 30 to 40 N/25 mm at seal temperatures above 110° C., and the HSIT is around 95° C.

Figure 2:
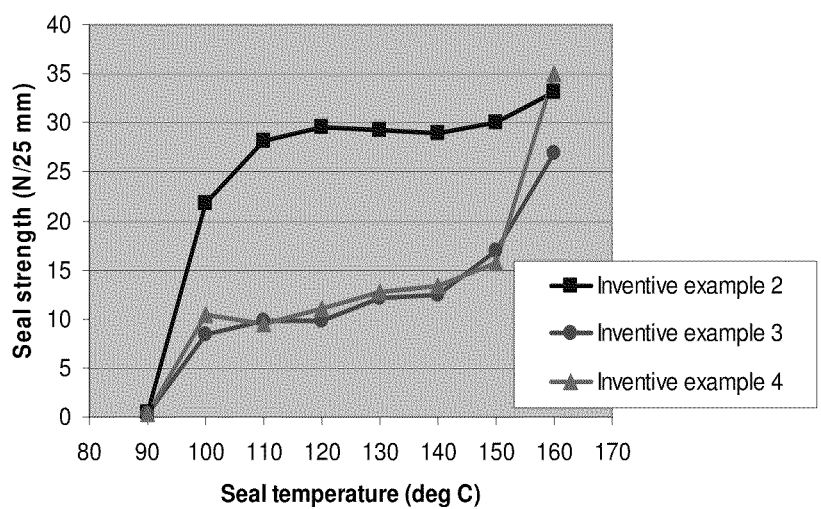
FIG. 2 is a graph of the heat seal strength vs. seal temperature curves for inventive examples 2, 3 and 4.

The heat seal strength vs. seal temperature curves of the inventive example 2, 3, and 4 are shown in FIG. 2. This Figure demonstrates that despite downgauging the core layer to 6 μm, it is still possible to achieve seal strength values higher than 10 N/25 mm. The three films in FIG. 2 have the same film structure except for differing ratios of resins A and B in the core layer. FIG. 2 therefore also demonstrates the higher seal strength (around 30 N/25 mm) obtainable when using core layers containing blends made from the more preferred ranges.

The following recitations indicate additional aspects of the invention. Although such recitations may not all be currently claimed, the applicants reserve the right to add claims corresponding to these recitations at a later date.

1. A multilayer biaxially oriented polypropylene film comprising:
   a. an outer layer comprising a first polymer which is a homopolymer polypropylene resin having a melting point of at least 155° C.;
   b. a core layer, with a melting point greater than 150° C., comprising a blend comprising a second polymer which is a polypropylene homopolymer having a melting point of at least 155° C. and a third polymer having a melting point no greater than 145° C., wherein the second polymer comprises from 20% to 80% by weight of the core layer while the third polymer comprises from 80% to 20% by weight of the core layer; and
   c. a sealant layer comprising a fourth polymer having a melting point no greater than 145° C.
2. The film of recitation 1 wherein the third polymer is a propylene copolymer or an ethylene copolymer.
3. The film of recitation 1 wherein the core layer thickness is no more than 75% of the film thickness.
4. The film of recitation 1 wherein the outer layer has a thickness of from 10 μm to 40 μm.

5. The film of recitation 1 wherein the sealant layer has a thickness of from 0.4 μm to 20 μm.
6. The film of recitation 1 wherein the fourth polymer is a propylene copolymer or an ethylene copolymer.
7. The film of recitation 15 wherein the fourth polymer comprises a polypropylene based plastomer or elastomer.
8. The film of recitation 15 wherein the fourth polymer comprises an ethylene copolymer having a density less than 0.925 g/cc.
9. The film of recitation 15 wherein the fourth polymer comprises an olefin block copolymer.
10. The film of recitation 1 wherein the fourth polymer has a melting point less than 130° C.
11. The film of recitation 1 wherein the fourth polymer has a melting point less than 110° C.
12. The film of recitation 1 wherein the blend in the core layer comprises no more than 80% of the third polymer by weight of the core layer.
13. The film of recitation 1 wherein the blend in the core layer comprises at least 20% of the second polymer by weight of the core layer.
14. The film of recitation 1 wherein the second polymer is homopolymer polypropylene having a melting temperature greater than 160° C.
15. The film of recitation 1 wherein the third polymer has a melting point no greater than 145° C.
16. The film of recitation 1 wherein the third polymer has a melting point larger than 80° C.
17. The film of recitation 1 wherein the film has a heat seal initiation temperature no greater than 130° C.
18. The film of recitation 1 wherein the third polymer has a Vicat softening point of at least 60° C.
19. The film of recitation 1 wherein the blend which comprises the core layer has been prepared by melt compounding or simple dry blending/tumbling.

What is claimed is:

1. A multilayer biaxially oriented polypropylene film comprising:
   a. an outer layer comprising a first polymer which is a homopolymer polypropylene resin having a melting point of at least 155° C.;
   b. a core layer, with a melting point greater than 150° C., comprising a blend comprising a second polymer which is a polypropylene homopolymer having a melting point of at least 155° C. and a third polymer having a melting point no greater than 145° C., wherein the second polymer comprises from 20% to 80% by weight of the core layer while the third polymer comprises from 80% to 20% by weight of the core layer, a thickness of the core layer being the same as or smaller than a thickness of the outer layer; and
   c. a sealant layer comprising a fourth polymer having a melting point no greater than 145° C.

2. The film of claim 1 wherein the film has been coextruded.
3. The film of claim 1 wherein the third polymer is a propylene based plastomer or elastomer.
4. The film of claim 1 wherein the third polymer is an ethylene copolymer having a density less than 0.916 g/cc.
5. The film of claim 1 wherein the third polymer is an olefin block copolymer.
6. The film of claim 3 wherein the propylene based elastomer or plastomer comprises units derived from propylene and units derived from ethylene.
7. The film of claim 6 wherein the units derived from ethylene comprise from 0.04 to 15% by weight of the propylene based plastomer or elastomer.
8. The film of claim 1 wherein the film has a thickness of from 15 μm to 80 μm.
9. The film of claim 1 wherein the thickness of the core layer is from 2 μm to 20 μm.
10. The film of claim 1 wherein the first polymer has a melting point greater than 160° C.
11. The film of claim 1 wherein the fourth polymer has a melting point of at least 90° C.
12. The film of claim 1 wherein the film has a heat seal strength of at least 10 N/25 mm.
13. The film of claim 1 wherein the film has a heat seal initiation temperature no greater than 100° C.
14. The film of claim 1 wherein the first polymer and the second polymer are the same material.
15. The film of claim 1 wherein the third polymer and the fourth polymer are the same material.

* * * * *